(12) United States Patent
Iverson (10) Patent No.: US 7,717,467 B2
(45) Date of Patent: May 18, 2010

(54) VEHICLE MUD FLAP WITH SLIDING FENDER FOLD CLAMP

(75) Inventor: David Iverson, Chicago, IL (US)

(73) Assignee: David F. MacNeil, Hinsdale, IL (US)

( * ) Notice: Subject to any disclaimer, the term of this patent is extended or adjusted under 35 U.S.C. 154(b) by 810 days.

(21) Appl. No.: 11/555,601

(22) Filed: Nov. 1, 2006

(65) Prior Publication Data

US 2007/0096454 A1    May 3, 2007

Related U.S. Application Data

(63) Continuation-in-part of application No. 11/554,555, filed on Oct. 30, 2006, now abandoned.

(51) Int. Cl.
*B62D 25/18* (2006.01)
(52) U.S. Cl. .................. 280/847; 280/154; 280/851
(58) Field of Classification Search ............... 280/154, 280/847, 848, 851
See application file for complete search history.

(56) References Cited

U.S. PATENT DOCUMENTS

| | | | |
|---|---|---|---|
| 1,513,167 A | | 10/1924 | Fleming |
| 1,809,711 A | | 6/1931 | Kile |
| 2,012,921 A | * | 8/1935 | Bahr .................. 280/851 |
| 2,057,322 A | * | 10/1936 | Balthazor ............. 280/849 |
| 2,077,818 A | * | 4/1937 | Zaiger ................ 280/851 |
| 2,141,140 A | * | 12/1938 | Johnson .............. 280/851 |
| 2,826,428 A | | 3/1958 | Lincoln |
| 3,953,053 A | | 4/1976 | Arenhold |
| 4,323,262 A | | 4/1982 | Arenhold |
| 4,505,010 A | * | 3/1985 | Arenhold ............. 24/456 |
| 4,605,238 A | | 8/1986 | Arenhold |
| 4,688,814 A | | 8/1987 | Arenhold |
| 4,733,879 A | | 3/1988 | Arenhold |
| 4,856,816 A | * | 8/1989 | Francis ............... 280/851 |

(Continued)

FOREIGN PATENT DOCUMENTS

DE          3532985 A1    3/1987

(Continued)

OTHER PUBLICATIONS

Search Report, The Patent Office, Application No. GB 9711746.9, Nov. 16, 1998.

(Continued)

*Primary Examiner*—Lesley Morris
*Assistant Examiner*—Chiedu A Chibogu
(74) *Attorney, Agent, or Firm*—Momkus McCluskey, LLC; Jefferson Perkins (57) ABSTRACT

The drilling of new holes into a vehicle fender fold is avoided by providing a mud flap with a sliding clamping member. When an attachment bolt is slid in a slot formed in the polymeric mud flap body, the sliding clamping member slides with it from a disengaged position to a second position behind the fender fold. A wall integrally formed in the mud flap body prevents rotation of the clamping member as the attachment bolt is rotated, drawing the clamping member forwardly on the threads of the attachment bolt to clamp the fender fold between the sliding clamping member and a stationary clamping member insert-molded into the mud flap body.

36 Claims, 9 Drawing Sheets

U.S. PATENT DOCUMENTS

| | | | |
|---|---|---|---|
| 5,048,868 | A | 9/1991 | Arenhold |
| 6,431,605 | B1 | 8/2002 | Miller et al. |
| 6,648,373 | B2 | 11/2003 | Hawes |
| 6,919,501 | B2 | 7/2005 | Burton |
| 6,971,828 | B2 | 12/2005 | Bernardo |
| 6,974,175 | B2 | 12/2005 | Willey |

FOREIGN PATENT DOCUMENTS

| | | | |
|---|---|---|---|
| DE | 4415648 C1 | | 7/1995 |
| EP | 1902 A1 | * | 5/1979 |
| EP | 58508 A1 | * | 8/1982 |
| FR | 2410591 A | | 8/1979 |
| GB | 2045706 A1 | | 11/1980 |
| GB | 2114946 A1 | | 9/1983 |
| GB | 2223723 A1 | | 4/1990 |
| GB | 2327401 A1 | | 1/1999 |
| JP | 4244488 A1 | | 9/1992 |

OTHER PUBLICATIONS

U.S. Appl. No. 11/534,242, David Iverson, Vehicle Mud Flap With Fender Fold Clamp, Filed Sep. 22, 2006.

U.S. Appl. No. 11/534,242, David Iverson, Vehicle Mud Flap with Fender Fold Clamp, Filed Sep. 22, 2006.

* cited by examiner

VEHICLE MUD FLAP WITH SLIDING FENDER FOLD CLAMP

RELATED APPLICATIONS

This application is a continuation in part of U.S. patent application Ser. No. 11/554,555, filed Oct. 30, 2006, assigned to the assignee hereof and the specification and drawings of which are fully incorporated by reference herein.

BACKGROUND OF THE INVENTION

Conventional motor vehicles have tires partly recessed in wheel wells. Of course the tire extends below, and often far below, the bottom body panel of the vehicle. As it rotates on a surface each wheel (particularly if it is a drive wheel) will have a tendency to kick up tar, water, mud, stones and debris onto the vehicle body panel or rearwardly into the path of traffic behind the vehicle.

To mitigate this problem, mud flaps have been devised which attach to the rear of each wheel well and which extend downward toward the road surface, intercepting much of the matter spinning off of the wheel. Many of these mud flaps have been designed for the automotive aftermarket, in which a vehicle owner will attach the mud flap to the wheel well himself or herself. Prior automotive mud flaps have required further holes to be drilled into the flange called a "fender fold" or lip, which is an extension of the vehicle body panel that skirts the wheel well and which commonly is fabricated of sheet steel. While the use of through-fasteners through such holes usually will assure firm affixation of the mud flap to the vehicle, drilling the holes creates a serious corrosion problem and may void the OEM corrosion warranty.

Prior attempts to affix mud flaps to vehicles without drilling such holes have been less than satisfactory. As can be imagined, a mud flap dropping off of a vehicle at Interstate highway speeds creates a serious safety issue. A need therefore persists for methods and fasteners for firmly affixing mud flaps to vehicle wheel wells without creating a corrosion problem.

SUMMARY OF THE INVENTION

According to one aspect of the invention, a mud flap is provided which can be securely affixed to a fender fold of a vehicle without drilling further holes into the fender fold. A body of the mud flap is molded of polymeric material. A screw-threaded attachment bolt is received through an elongate slot that in turn is formed to extend from a front face of the mud flap (facing the vehicle wheel) to a rear face thereof (to be fitted to the vehicle wheel well). A sliding clamping member is threadedly carried on the attachment bolt by means of a bolt hole. A clamping end of the sliding clamping member extends in an outboard direction from the bolt hole. The sliding clamping member is translatable, in combination with the attachment bolt, along the slot from a first, disengaged position, in which the clamping end is not behind the fender fold, to a second position in which the clamping end is behind the fender fold. A guide is integrally molded into the mud flap body to extend rearwardly from a general rear surface thereof. At least a portion of this guide is sufficiently proximate a lateral edge of the sliding clamping member that it prevents the rotation of the sliding clamping member and attachment bolt as a unit. When the attachment bolt is rotated, the sliding clamping member is drawn frontwardly on the threads of the attachment bolt from the second position to a third position proximate the rear face of the mud flap body, causing the clamping of the fender fold between the clamping end of the sliding clamping member and an edge of the mud flap body.

According to another aspect of the invention, a mud flap for attachment to a fender fold of a vehicle wheel well has a body with a front face for facing the vehicle wheel and a rear face for mounting to a vehicle wheel well. A screw-threaded attachment bolt is received into an elongate slot formed in the mud flap body from the front face of the body to a rear face thereof. A sliding clamping member is disposed rearwardly from the rear face of the mud flap body and has a clamping end which extends in an outboard direction from the bolt hole. The sliding clamping member is translatable, in combination with the attachment bolt, along the slot from a disengaged position in which the clamping end of the clamping member is not behind the vehicle fender fold, to an engaged position in which the clamping end of the clamping member is behind the vehicle fender fold. A guide disposed on the rear face the mud flap body extends rearwardly therefrom, and is disposed in sufficient proximity to at least one lateral edge of the sliding clamping member that rotation of the sliding clamping member with the attachment bolt as a unit is prevented. Once the sliding clamping member is in the second position, the consumer rotates the attachment bolt to draw the sliding clamping member forwardly on the threads of the bolt toward the rear face of the mud flap body, clamping the fender fold between the sliding clamping member and the mud flap body. Particularly after the mud flap is installed on the vehicle fender fold, no portion of the wall or the sliding clamping member is visible to an observer.

In a preferred embodiment of either of the above aspects, a preferably steel stationary clamping member is insert-molded into the polymer body of the mud flap, such that the clamping action actually occurs between the sliding clamping member and the stationary clamping member. It is further preferred that the clamping end and a fulcrum end of the sliding clamping member be offset forwardly from the general plane of the clamping member, which otherwise is flat. It is also preferred that the integrally molded wall have upper and lower sections or rails, such that a channel is formed adapted to slidably receive the sliding clamping member. Alternatively, the fulcrum end of the sliding clamping member can be turned forwardly.

In an alternative embodiment, the sliding clamping member has at least one, and preferably two, laterally extending tabs that are adapted to rest on the rear surfaces of respective end rail sections of the guide when the sliding clamping member is in an unengaged position. This support or propping of the lateral tabs prohibits the clamping of the mud flap to the fender fold until the sliding clamping member has been slid in an outboard direction by a sufficient amount that a firm purchase of the fender fold can be obtained. The rail sections terminate at points inboard of the fender fold so that, when the sliding clamping member has been slid outboard enough, the rail sections will no longer support the tabs and clamping force can be exerted between the sliding clamping member and the mud flap body.

The present invention thus provides a secure method of affixing a mud flap, or like object, to a vehicle without drilling further holes, and without requiring the end user to manipulate a fastener component on the relatively inaccessible, rearward side of the fender fold or back side of an object to be attached.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
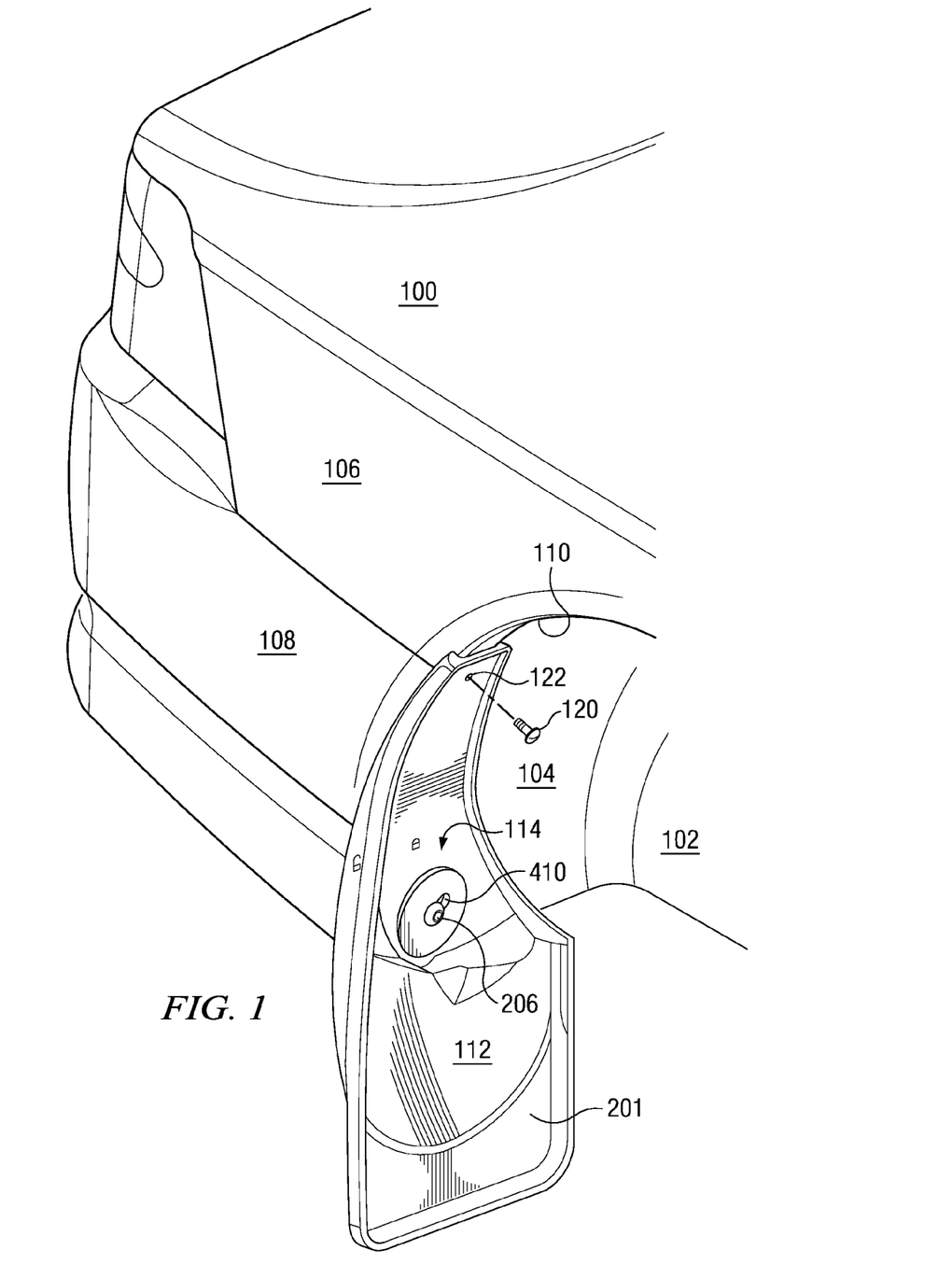
FIG. 1 is an isometric view of a mud flap according to the invention, shown installed on a rear vehicle wheel well.

FIG. 1 shows a conventional vehicle 100 with a wheel well 102. The wheel well 102 typically has a rear curved surface 104 that conforms approximately to a cylinder. The body 106 of the vehicle 100 is typically formed of one or more panels 108 of sheet steel which have been coated with an anticorrosion coating and painted; in certain vehicle models this sheet steel is replaced with another sheet material, such as plastic, aluminum or a fibrous composite. One or more such panels 108 are disposed to be adjacent the wheel well 102. At the juncture of the wheel well 102 and the panel 108, commonly the panel 108 is bent or folded in an inboard direction to make a fender fold or lip 110. This fender fold 110 follows curved surface 104 around at least a large portion of the wheel well 102.

A mud flap 112 according to the invention is affixed to a rearward portion of the curved surface 104, and is particularly placed such that an edge or portion of the mud flap 112 adjoins and is forward of the fender fold 110. The present invention uses the fender fold 110 as an anchor or gripping structure or purchase point to which the mud flap 112 may be securely fastened without drilling further holes in the fender fold 110. A consumer affixes the mud flap 112 to the fender fold 110 at least in part by means of a novel fastener 114, which will be described in more detail below. The fastener 114 is so constructed that the consumer may conveniently, yet securely, install the mud flap 112 without getting underneath the vehicle, and without, in at least some circumstances, obtaining physical access to the rear side of the fender fold 110.

One or more fasteners 114 may be used by themselves to secure the mud flap 112 to the vehicle. In the illustrated exemplary embodiment, a conventional fastener 120 (such as a sheet metal screw, push fastener or nut and bolt) is inserted through a hole 122 which lines up with a pre-drilled, stamped or otherwise formed hole (not shown) in the fender fold 110. For example, an OEM (original equipment manufacturer) fastener may be removed from this existing hole, the mud flap 112 superimposed over it such that the hole 122 is aligned with the OEM's existing hole, and a new (or even the same) fastener 120 may be used to affix the mud flap 112 to the fender fold 110 at this point.

Figure 2:
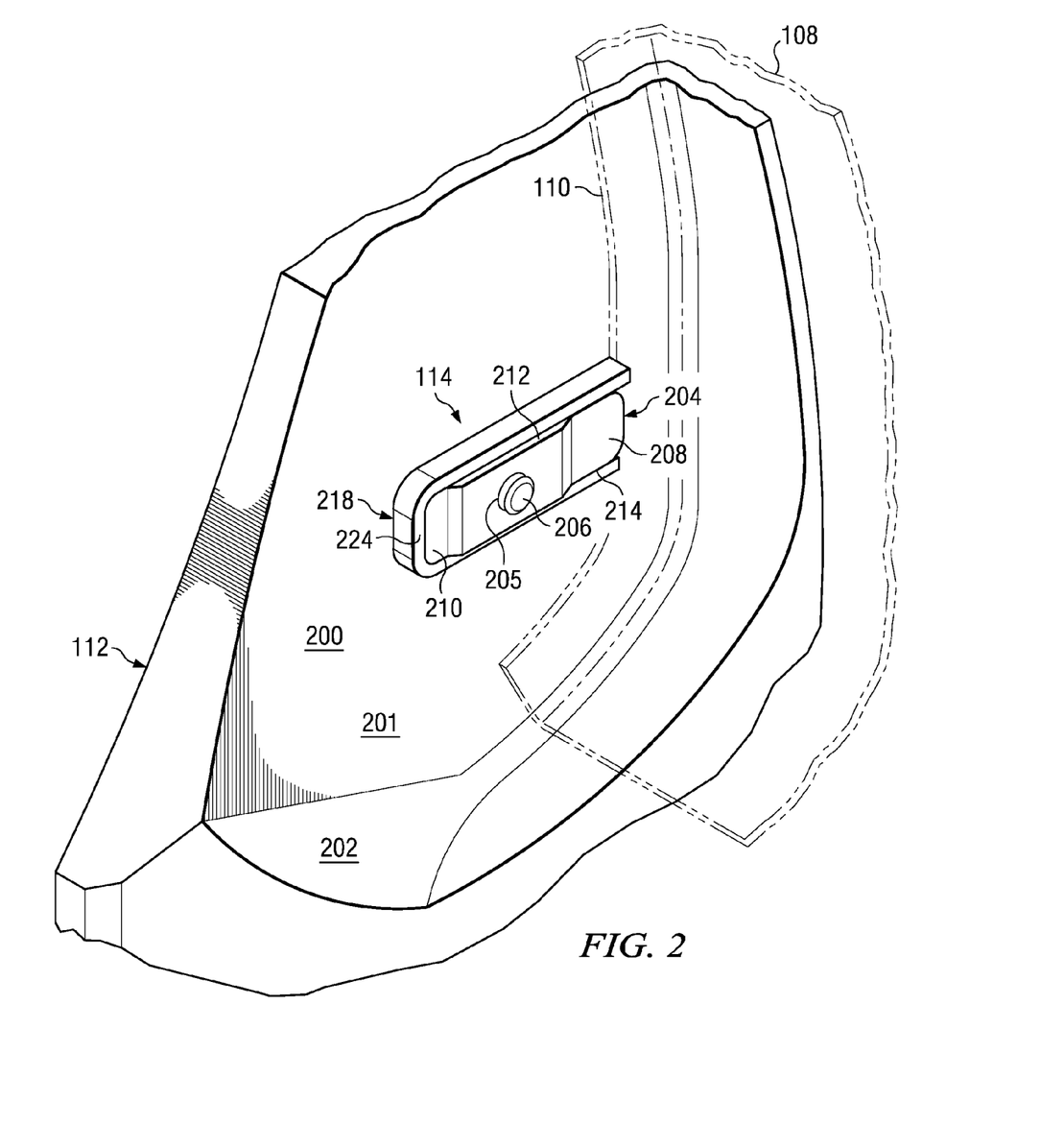
FIG. 2 is a detail of the mud flap shown in FIG. 1, taken from a rearward and inboard direction, showing a sliding clamping member of the mud flap fastener according a first embodiment of the invention in a first, disengaged position.
Figure 3:
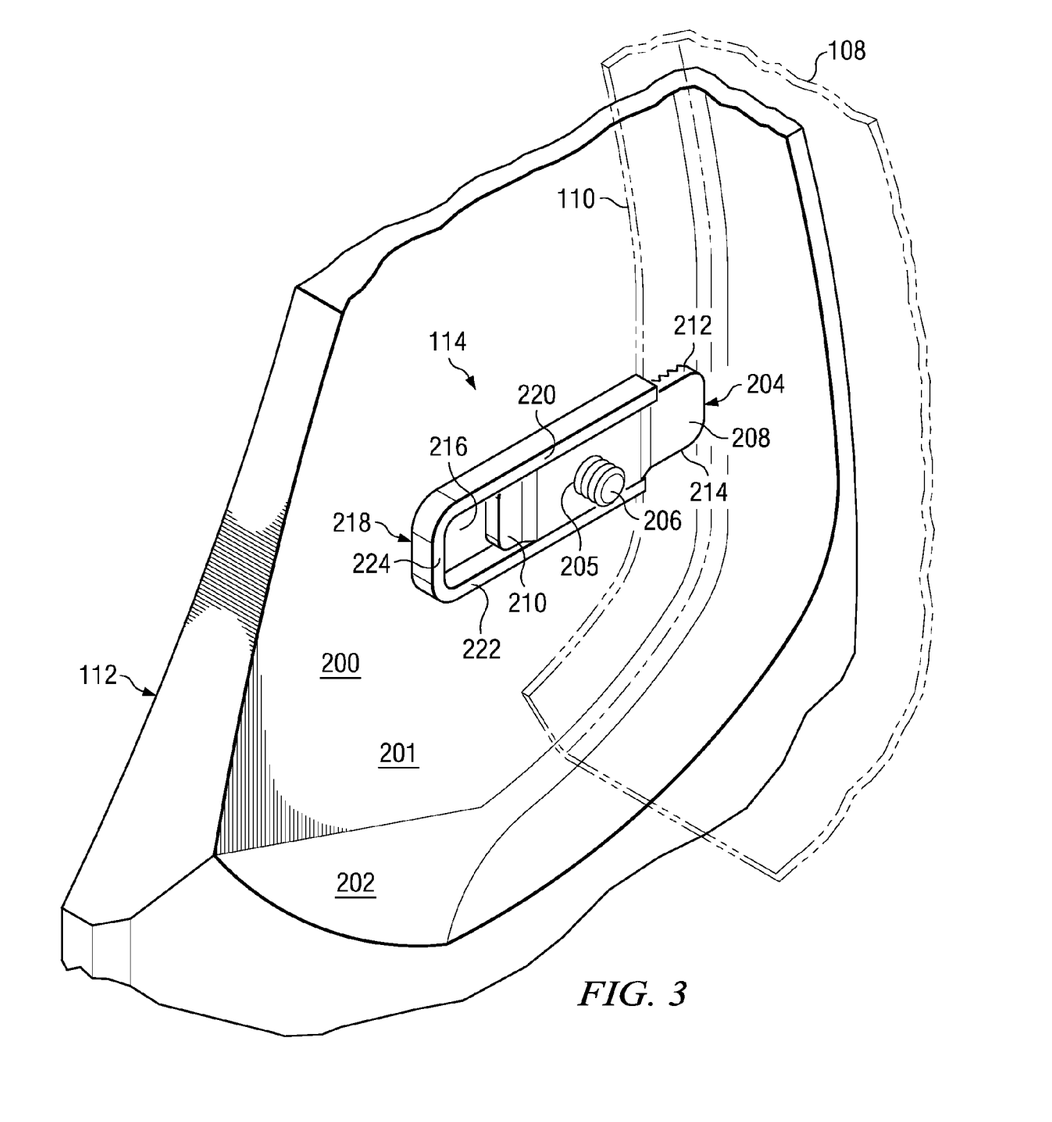
FIG. 3 is a view similar to that shown in FIG. 2, but after the sliding member has been slid to a position such that a clamping end thereof is behind a fender fold of the vehicle wheel well.

FIGS. 2 and 3 show a mud flap 112 in the process of being installed in a wheel well of a vehicle. The view of these FIGURES is from a rearward and inboard direction. The body panel 108, and the panel-terminating fender fold 110 which typically is an integral part of panel 108, are shown in phantom in FIGS. 2 and 3. In the illustrated embodiment, at the location where fastener 114 engages it, the fender fold 110 will stand substantially vertically and in a plane transverse to the direction of travel of the vehicle. But the fastener 114 of the present invention may be used to clamp the mud flap 112 to other locations along the fender fold 110, such as a location higher up on the wheel well 102, and more than one fastener 114 may be used to secure a single mud flap 112. Preferably, a rear surface or face 200 of the mud flap body 201 has an indentation 202 formed in it, so as to fit to both the rear surface 104 of the wheel well 102 (FIG. 1), as well as to an external surface of the body panel 108 as it continues rearwardly from the wheel well 102 (rightward in FIGS. 2 and 3). This allows for a perfectly matched fit of mud flap to fender.

FIG. 2 shows a sliding clamping member 204 of the fastener 114 having a threaded center hole 205 threaded onto a central attachment bolt or screw 206. The bolt 206 is rotatable by a consumer or installer from the opposed, front surface of the mud flap body 201 and extends through an elongate slot (later described) in the body 201 in the mud flap 112. The sliding member 204 has a clamping end 208 which extends in an outboard (in this FIGURE, rightward) direction from the bolt hole 205, and, angularly separated from it, a fulcrum end 210, which preferably extends from the bolt hole 205 in an inboard direction. It is preferred that both the clamping end 208 and the fulcrum end 210 be frontwardly offset from the remainder of the sliding clamping member 204, which otherwise is generally flat. Alternatively, the fulcrum end may be turned ninety degrees in a frontward direction, so that it registers with the rear face 200 of the body 201.

In the illustrated embodiment, the sliding clamping member 204 is elongate and relatively narrow in a vertical direction; in alternative embodiments, the sliding clamping member 204 can be more extensive in a vertical direction. It is preferred that the sliding clamping member have a pair of parallel lateral sides or edges 212, 214 which extend between the ends 208, 210.

The sliding clamping member 204 preferably is received within a channel 216 formed by a circumferential guide or wall 218 which extends rearwardly (in FIG. 2, toward the right and down) from the general rear surface 200 of the mud flap body 201. The guide 218, which can be formed of one or more walls, pegs, tabs, mesas or other eminences, should be so disposed that, if the consumer tightens the fastener by rotating the bolt 206 (counterclockwise in FIG. 2), one or both edges 212, 214 will come into contact with respective portions of the guide 218, preventing rotation of the sliding clamping member 204 as a unit with the central bolt 206. In a preferred form the guide 218 has an upper wall portion 220 and a lower wall portion 222, and it is more particularly preferred that these take the form of parallel rails as shown. The rails 220, 222 can be joined at their inboard ends by an inboard wall portion 224. The position of inboard wall portion 224 should be chosen such that it will not interfere with the fulcrum end 210 in its unengaged, inboard position. In an alternative embodiment, the guide 218 can be formed as the sidewall of a depression instead of the representative upstanding structure shown in the illustrated embodiment.

FIG. 2 shows the sliding fastener 204 in a first, unengaged position, in which the clamping end is not yet behind the vehicle fender fold 110. FIG. 3 is the same view but showing the sliding clamping member 204 after attachment bolt 206 has been slid inside of a slot (later described) from the first position to a second position. In the second position, the clamping end 208 is rearward (in FIG. 3, rightward and down) of the fender fold 110. When the attachment bolt is slid within its slot, the sliding fastener 204 commensurately slides within channel 216.

Figure 4A:
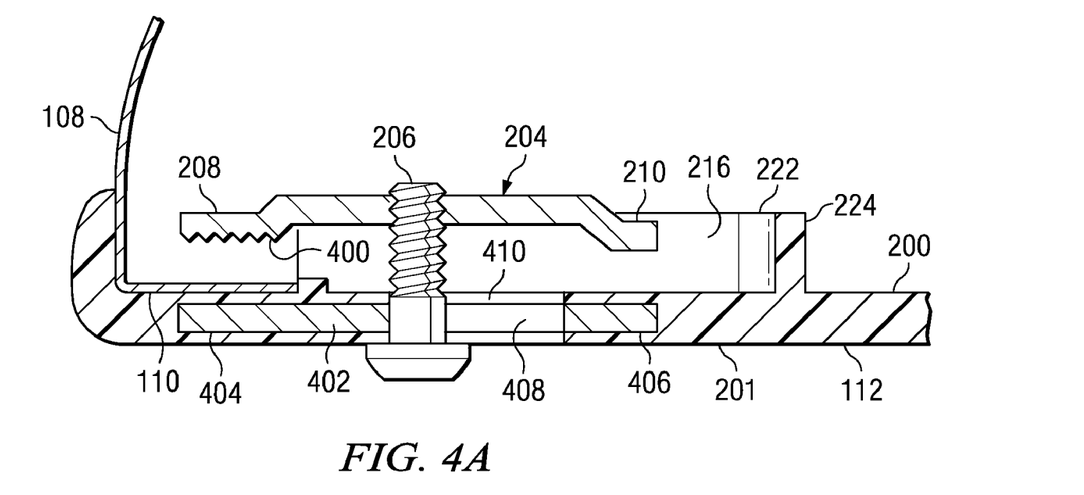
FIG. 4A is a sectional view taken through the mud flap and fender fold in a plane which includes a fastener bolt hole, showing the sliding member in a second position and prior to tightening.
Figure 4B:
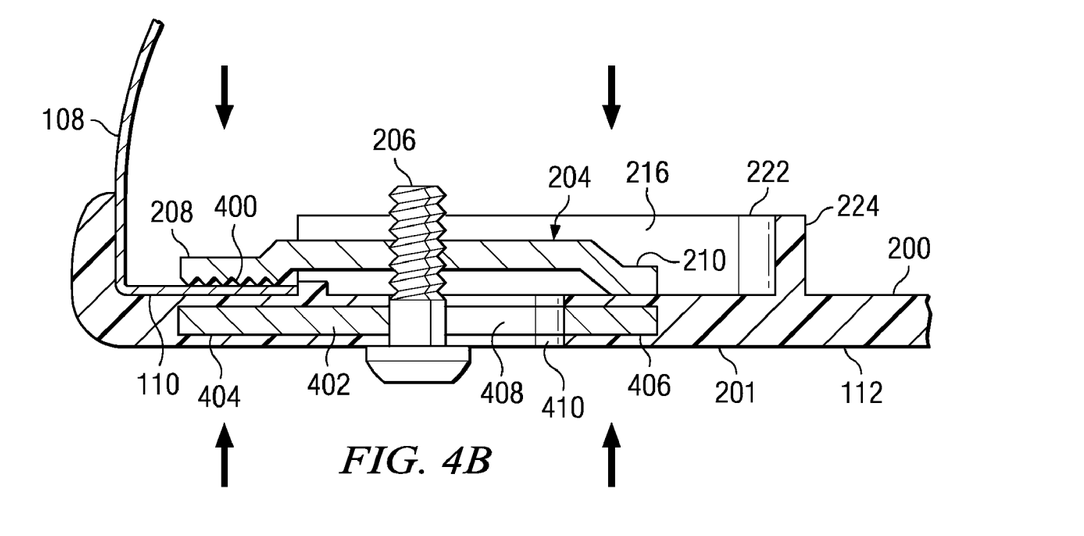
FIG. 4B is a sectional view similar to that of FIG. 4A, after the sliding member has been threadably pulled in on the fastener bolt to a third position, clamping the mud flap to the fender fold.

FIGS. 4A and 4B are sectional views taken from above through the bolt axis, wherein the sliding clamping member 204 is in the relatively outboard position seen in FIG. 3. In FIG. 4A, the sliding clamping member 204 is still residing on or near the free end of threaded bolt 206, in the second position, and spaced away from the general rear surface 200 of the mud flap body 201. Prior to sliding the bolt 206 from the first position to the second position, the consumer presses on the bolt head 502 with e.g. an Allen key, which ensures that the sliding clamping member is at its remotest position relative to the rear surface 200 of the mud flap body 201. One the bolt 206 and the sliding clamping member have been slid to the second position, the consumer rotates bolt 206 to draw the sliding clamping member 204 forwardly (in FIGS. 4A and 4B, downwardly) toward the rear surface 200 of the mud flap body 201, to a third, clamping position. The sliding clamping member 204 will not rotate with the bolt 204, because the upper and lower lateral edges 212, 214 FIGS. 2 and 3) abut the upper and lower wall portions or rails 220, 222. When the position shown in FIG. 4B is reached, teeth or ridges 400 formed on a forward side of the clamping end 208 begin to grip the rearward (here, upward) surface of the fender fold 110, while fulcrum end 210 will begin to bear on the rear surface 200 of the mud flap body 201.

It is further preferred to provide a stationary clamping member 402 against which the sliding clamping member 204 may exert clamping force. In the illustrated embodiment, the stationary clamping member 402 is provided as an insert-molded reinforcement to the otherwise rubber, plastic or other polymeric mud flap body 201. In other, nonillustrated embodiments, the stationary clamping member 402 is omitted and the clamping action takes place between the mud flap body and the sliding clamping member 204. In the embodiment shown in FIGS. 8A and 8B, the stationary clamping member is not insert-molded but rather is disposed on the front surface 500 of the mud flap body 201, as will be described below. In the illustrated embodiment, the stationary clamping member 402 is preferably about as thick as the sliding clamping member 204 (such as 0.125 in.), and is preferably made of a tough and durable material such as stainless steel. The stationary clamping member 402 should be at least coextensive in length with the clamping member 204, such that a first end 404 will be opposite the clamping end 208 of the sliding clamping member 204 when the latter has been slid to the second position, and a second end 406 of the stationary member 402 will be opposite the fulcrum end 210 in this position. Conveniently, the stationary member 402 and the sliding clamping member 204 can be fashioned from the same blank stamped out of sheet steel; in the instance of the sliding clamping member 204, the blank's central hole would be tapped and the ends 208, 210 offset; in the instance of stationary member 402, an elongate slot 408 would be formed to slidably receive the bolt 206.

When the bolt 206 is tightened even more from the position shown in FIG. 4B, sliding member 204 will begin to pivot around its contact with fender fold 110, until the fulcrum end 210 is pulled more forwardly than clamping end 208 and abuts the rearward (here, upward) surface 200 of the mud flap body 201. When this happens, the contact between the fulcrum end 210 and the rear surface 200 will act as a fulcrum, concentrating more clamping force between clamping end 208 and the end 404 of the stationary clamping member 402. To maximize this leverage, it is preferred that the clamping end 208 and the fulcrum end 210 be angularly spaced apart by about 180 degrees.

FIGS. 4A and 4B also demonstrate the advantage of offsetting the ends 208 and 210 in a forward direction. As so offset, the end 208 will contact the fender fold 110 first, concentrating clamping force within a limited footprint. The end 210 will contact surface 200 prior to the un-offset rest of the clamping member 204 bottoming out on the mud flap 112, thereby locating the fulcrum at a maximum distance away from the fender fold 110 and maximizing clamping leverage exerted by bolt 206.

FIGS. 4A and 4B also show an elongate slot 410 formed in the mud flap body 201 to extend from the forward face thereof to the rearward face 200. In the illustrated embodiment, this slot 410 is coextensive with (and is in part made up by) slot 408 formed in the stationary clamping member 402. The length of slot 410 preferably should be chosen to be about the same as the displacement of clamping end 208 between the first (unengaged) position and the second position thereof shown in FIGS. 4A and 4B. It is preferred that slot 410 be linear, although arcuate slots (and therefore an arcuate sliding motion of the clamping member 402) could be provided instead.

Figure 5A:
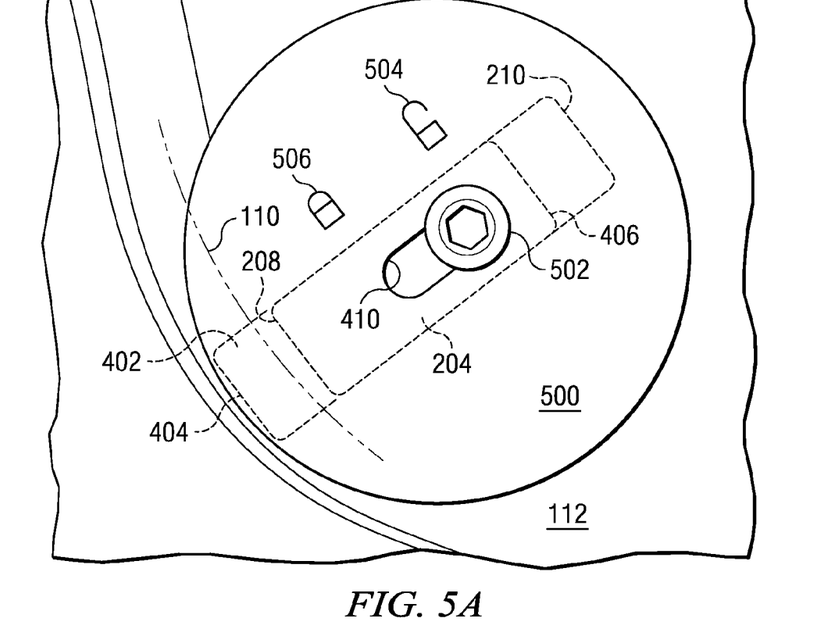
FIG. 5A is a detail of the mud flap from a forward position looking rearward, showing the sliding clamping member in dotted line in a first, disengaged position.
Figure 5B:
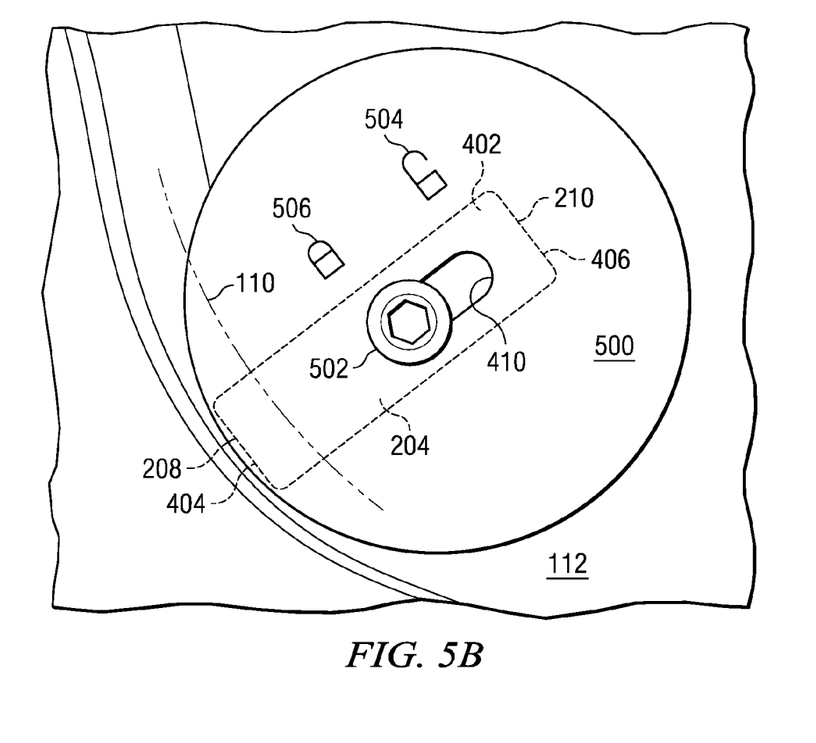
FIG. 5B is a detail similar to that shown in FIG. 5A, showing the sliding clamping member in an engaged position such that a clamping end of the sliding clamping member is behind the fender fold.

FIGS. 5A and 5B are views from the front face 500 of the mud flap 112, which is the face that faces the wheel well and which is accessible by the consumer. A head 502 of the bolt 206 in the illustrated embodiment takes an Allen key, but other sorts of receptacles for torque- and displacement-imparting drivers can be used instead, such as a Philips head or a Torx receptacle.

In FIG. 5A, the sliding member 204, shown in dotted line, is in a first, disengaged position, which is the position that it is in as received by the consumer. It can be seen that no portion of the sliding clamping member 204 is behind the fender fold 110, represented here by a vertical dashed line. It can also be seen that even in this first position, no portion of either the sliding clamping member 204 or the channel-forming guide 218 is visible from the front side (which will be the only side of the fastener 114 visible once the mud flap 112 is installed). In this first position, the bolt head 502 is on the right (inboard) end of the slot 410, next to an indicium 504 that indicates that the fastener 114 is in an "unlocked" or unfastened position.

Stationary clamping member 402 is in this embodiment substantially laterally coextensive with the sliding clamping member 204. It can be seen that end 404 of the stationary clamping member 402 is located in front of the fender fold 110.

In FIG. 5B, using e.g. an Allen key the consumer has slid the bolt head 502 in a leftward (outboard) direction in slot 410, sliding with it the rest of the attachment bolt 206 and the sliding clamping member 204 carried on it. The clamping end 208 of the sliding member 204 slides behind the fender fold 110, capturing the fender fold 110 in between two preferably steel clamping members 204 and 402. The bolt head 502 thereupon is positioned adjacent to an indicium 506 that indicates that the fastener is in a "locked" position. This gives the consumer the very important piece of information that the clamping end 208 has been successfully slid to a point in back of the fender fold 110. Once the sliding member is slid to the position shown in FIG. 5B, the consumer tightens the bolt head 502 (typically, in a clockwise direction) to cause the clamping member 204 to advance forwardly on the threads of the bolt 206, in a direction toward the reader in FIG. 5B. Since members 204 and 402 are preferably fairly thick (such as 0.125 in.) steel shapes that are held together by a rugged bolt 206, an exceptionally large amount of clamping force can be exerted between members 204 and 402, securely capturing the fender fold 110 between them. A very secure fastening result is critical to consumer acceptance of the product as well as to product safety.

FIGS. 6A-7B illustrate an alternative embodiment of the invention. As before, an attachment bolt 206 slides within a slot 410 formed through the body 201 of the mud flap 112. But the form of the guide 600 and the sliding clamping member 602 is changed. As before, it is preferred that the guide 600 have as portions thereof an upper wall portion or rail 604 and a lower wall portion or rail 606, and that these rails 604, 606 be parallel to each other. Rails 604, 606 may be joined by an end wall section 608 as shown. In general, the wall portions 604, 606 of the guide 600 have a first "height" in a rearward direction (rightward and downward in FIGS. 6A and 6B) that is uniform through a inboard portion of their lengths, and which is selected to be substantially larger than the thickness of the fender fold 110 to which the fastener 610 is adapted to be clamped. But each of the guide rails 604, 606 terminates in an outboard portion 612, 614 which has a height that is less than this, but which is still greater than the thickness of the fender fold 110. The height difference between the inboard portions of the wall rails 604, 606 and the end portions 612, 614 thereof create a sidewalls or stops 616, 617. The end portions 612, 614 terminate in respective ends 618, 619 that intentionally are displaced from the edge of the fender fold 110.

Figure 6A:
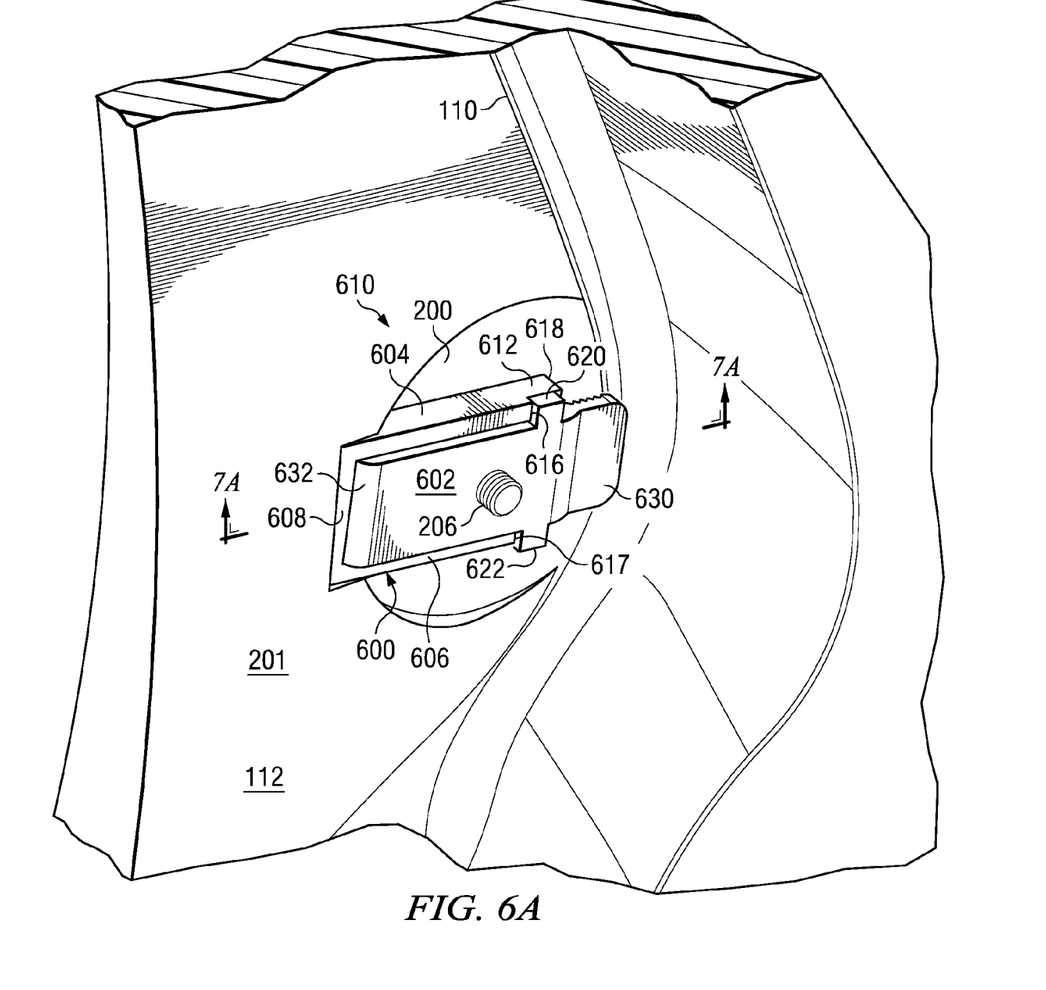
FIG. 6A is an isometric view of a second embodiment of the invention, in which a tabbed sliding clamping member is propped in a rearward direction to prevent a clamping end thereof from being clamped to a fender fold when the sliding clamping member is in an unengaged position.
Figure 6B:
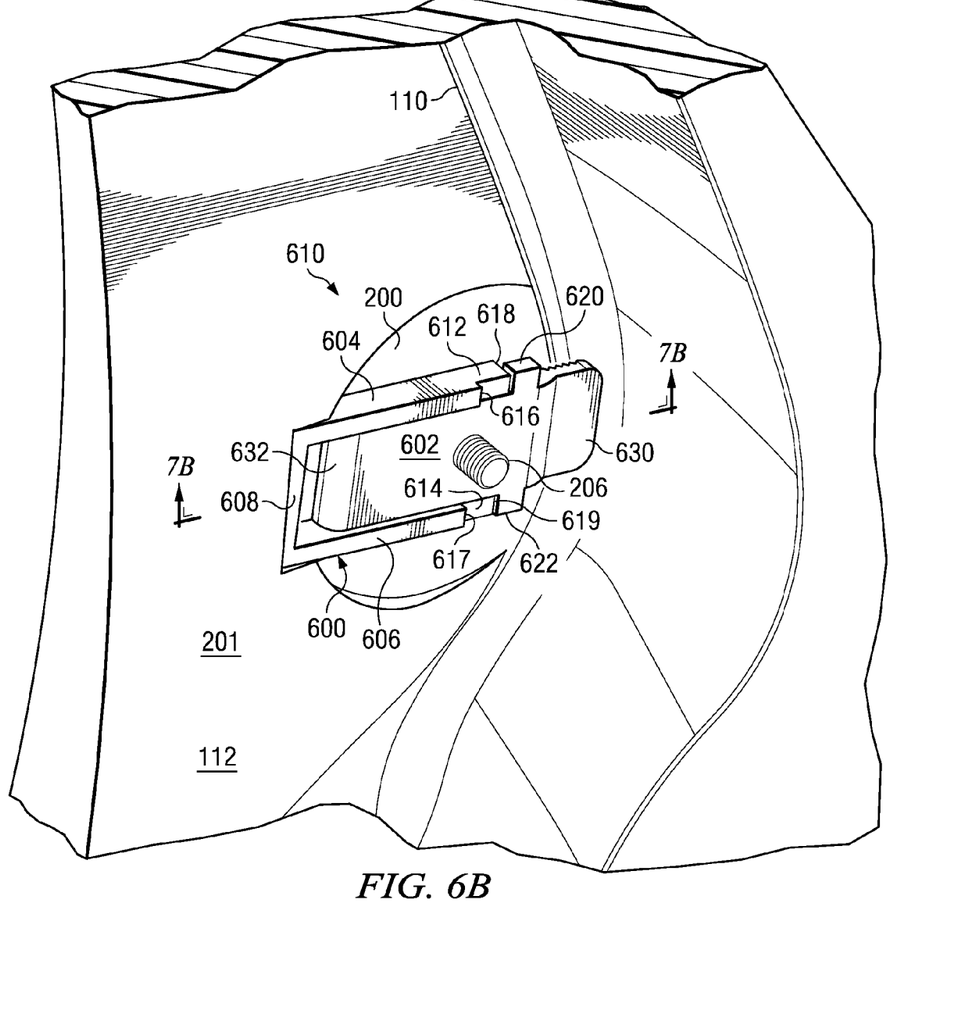
FIG. 6B is a view similar to that shown in FIG. 6A, but showing the tabbed sliding clamping member in an engaged position.

The morphology of sliding clamp member 602 has been changed to include a pair of cross tabs 620, 622 that extend upwardly and downwardly so that the general width of the sliding clamp member 602, and the channel formed by wall sections 604, 606, is exceeded by the cross tabs 620, 622. In a first, unengaged position, cross tab 620 will abut stop surface 616, and cross tab 622 will abut a similar stop surface 617 on the other rail 606. The wall sections 612, 614 support or prop end 630 of the sliding clamping member "above" (actually, rearwardly of) the general rear surface 200 of the mud flap by an amount preselected to make it impossible to clamp the mud flap to the fender fold 110 in this position.

In the illustrated embodiment, a clamping end 630 of the sliding clamp member 602 continues to be offset, as shown. A fulcrum end 632, instead of being offset, is turned to extend forwardly (downwardly in FIGS. 7A and 7B), registering with and sliding along either a surface of a shelf 650 (FIG. 7A) or, after end 652 of the shelf 650 has been cleared as the sliding clamp member is slid in an outboard direction, along the channel "floor" or rear surface 200 of the mud flap body 201 FIG. 7B). The fulcrum end 632 could instead be offset as before. It is also possible to use the turned fulcrum end 632 seen in this embodiment shown in FIGS. 1-5B hereof.

Figure 7A:
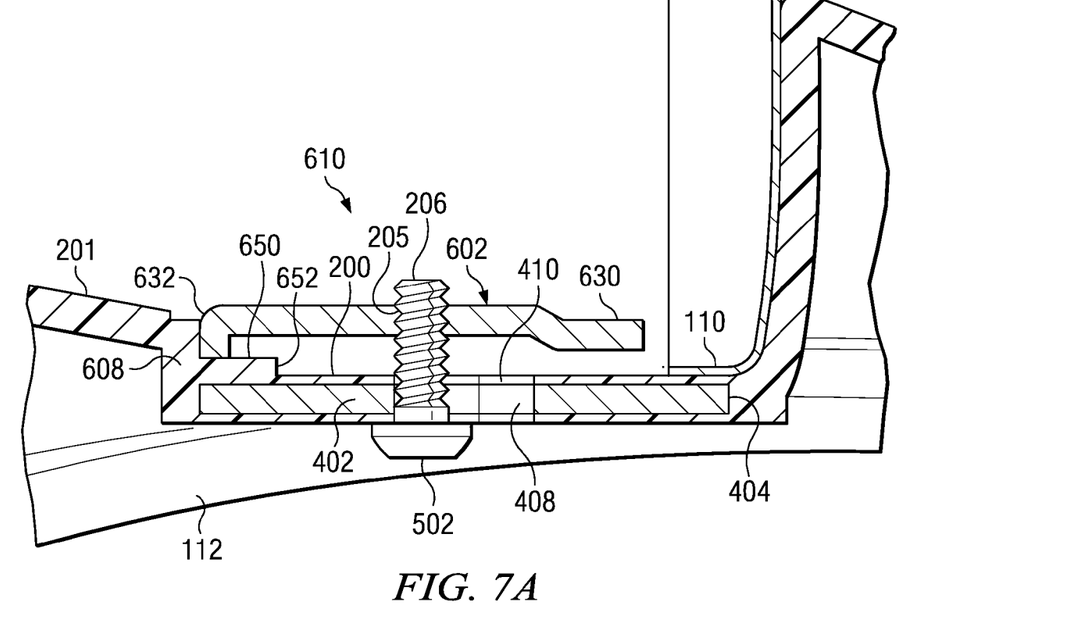
FIG. 7A is a sectional view taken substantially along line 7A-7A of FIG. 6A.
Figure 7B:
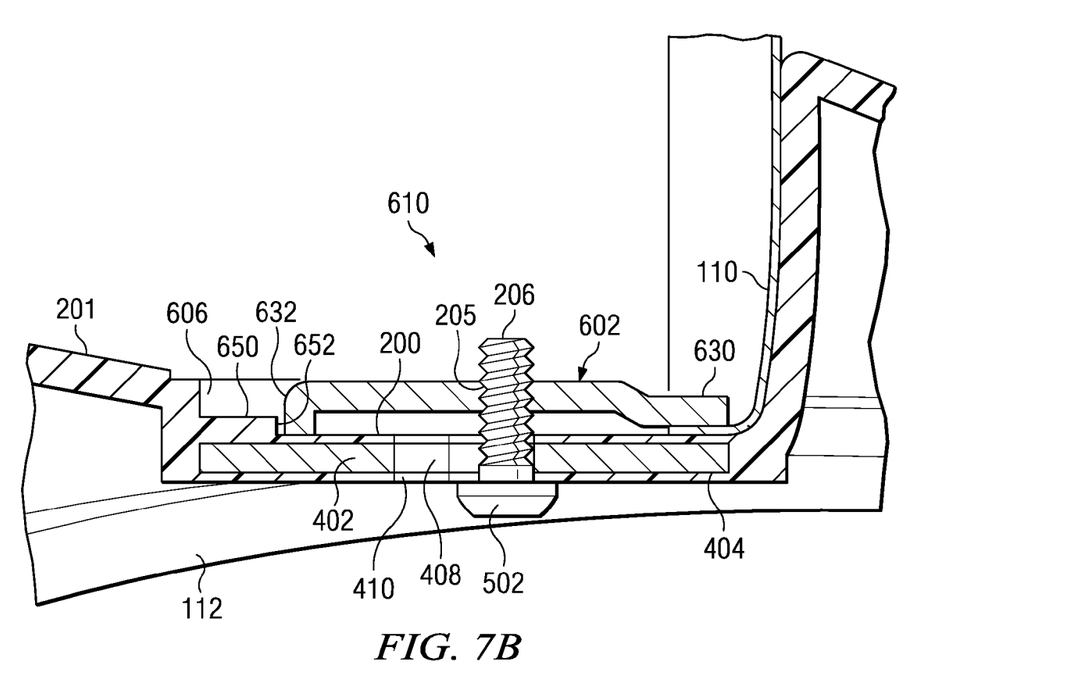
FIG. 7B is a sectional view taken substantially along line 7B-7B of FIG. 6B.

FIGS. 6B and 7B show fastener 610 in a fully clamped position. To arrive at this position, the consumer slides the attachment bolt 206 and the sliding clamping member 602 carried thereon in an outboard direction (to the right in FIG. 6B) inside of the slot. When this happens, the cross tabs 620, 622 clear the rail sections 612, 614 until they are beyond ends 618, 619 thereof. At the same time, the fulcrum end 632 slides along the surface of block 650 until it clears its end 652. This sliding motion permits the cross tabs 620, 622 to "drop" toward the rear surface 200 (that is, in a forward direction). But, since clamping end 630 will at this point be behind the fender fold 110, there is an assurance that clamping force between the sliding clamping member 602 and the mud flap body 112 (and preferably the stationary clamping member insert-molded therein) will be exerted on the fender fold 110 rather than on the fastener components by themselves. Hence, the consumer will not be able to affix the mud flap to the vehicle using this fastener unless he or she has slid the sliding fastener in an outboard direction by at least a predetermined distance, thereby assuring a good clamping purchase on the fender fold 110.

Figure 8A:
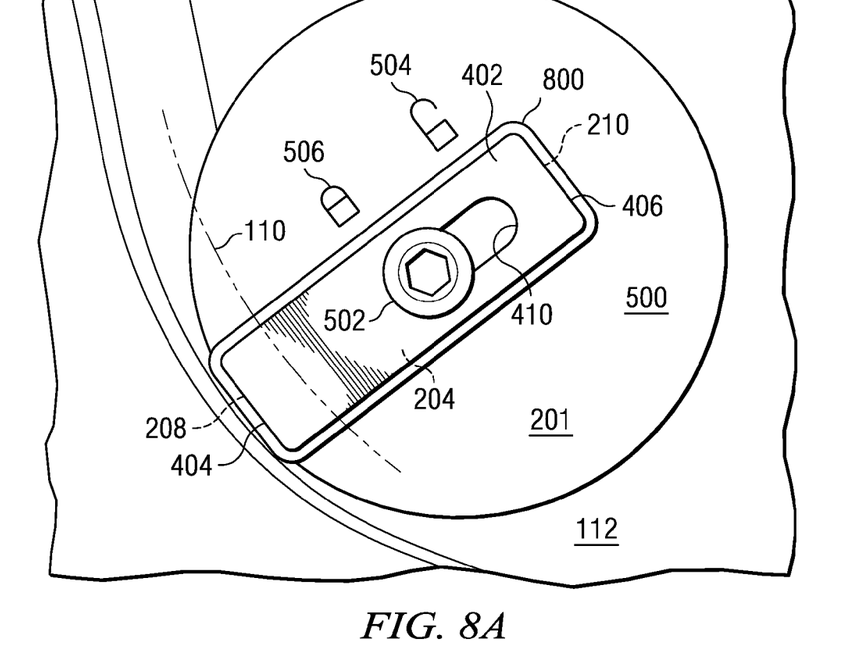
FIG. 8A is a detail view of a third embodiment of the invention, taken from a forward position of the mud flap and looking rearward.
Figure 8B:
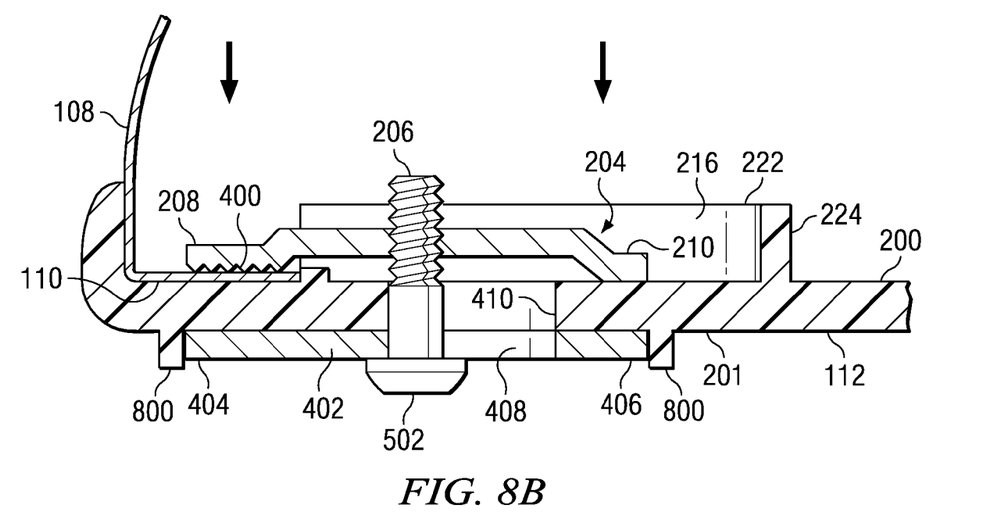
FIG. 8B is a sectional view of the embodiment shown in FIG. 8A.

FIGS. 8A and 8B illustrate a third embodiment of the invention, similar to the embodiment shown in FIGS. 1-5B. In this embodiment, however, the stationary clamping member 402 is not insert-molded into the body 201 of the mud flap 112, but rather is disposed on the forward side 500 of it. A circumferential sidewall 800 preferably is formed to project forwardly from the general front surface 500 of the mud flap, so as to contain and position the stationary clamping member 402. In one embodiment, the circumferential sidewall (or other structure which will fix the stationary clamping member in place, such as peg(s) going through specially provided hole(s) in member 402, or opposed sidewalls which cage the member 402 therebetween) is dimensioned to closely receive the stationary member 402, or even ends in an enlargement or process beyond which the stationary member 402 must be snapped to thereby be retained against the front face 500. Such an embodiment may be desirable where the user desires to avoid the additional cost of insert molding.

The illustrated embodiments show the structure and operation of one fastener according to the invention. More than one of these can be used to affix a single object to a vehicle. For example, the fasteners 114, 610 could be used at several places along an arc to affix a wheel well cover in place over a vehicle wheel well. In use a fastener 114 or 610 can be disposed vertically, horizontally or at some disposition in between, as might occur where an object is being affixed to various locations along a long arc of a fender fold 110. The reader will note that the illustrated position of fasteners 114, 610 is along the fender fold 110 in a corner or transition region between vertical and horizontal fender fold portions.

In summary, a clamping fastener has been shown and illustrated which obviates the need for drilling new holes in fender folds or other vehicle purchase points. Instead, a sliding clamping member is slid on a bolt or screw until a clamping end is positioned behind the fender fold or other the consumer rotates the attachment bolt to cause the sliding clamping member to be drawn toward a stationary clamping member of the fastener, securely clamping the fender fold or other vehicular purchase point between the two clamping members. In a preferred embodiment the stationary member of the fastener is insert-molded within a polymer body of the object to be attached, such as a mud flap. A visual indicator has been provided such that the consumer can easily tell whether the sliding clamping member has been slid to a position behind the fender fold or purchase point, so that the consumer may be assured that the fastener is actually clamping on to the fender fold or the like instead of just to the mud flap or other object to be affixed. In one embodiment, the support of end rail sections of side tabs on the sliding clamping member militate against premature clamping and force the consumer to slide a sufficient amount of the sliding clamping member behind the fender fold before clamping action to the fender fold can be obtained.

While certain embodiments of the present invention have been described above and illustrated in the appended drawings, the present invention is not limited thereto but only by the scope and spirit of the appended claims.

I claim:

1. A mud flap for attachment to a fender fold of a vehicle wheel well, comprising:
   a mud flap body having a front face for facing a wheel of the vehicle and a rear face for mounting to the vehicle wheel well the mud flap body molded of polymeric material;
   a screw-threaded attachment bolt received into an elongate slot formed in the mud flap body from the front face to the rear face thereof;
   a sliding clamping member having a bolt hole which is threadably carried on the attachment bolt, the sliding clamping member disposed rearwardly from the rear face of the mud flap body, a clamping end of the sliding clamping member extending in an outboard direction from the bolt hole, an edge of the mud flap body placed forwardly of the fender fold, the sliding clamping member translatable, in combination with the attachment bolt, along the elongate slot from a disengaged position in which the clamping end is not behind the fender fold to an engaged position in which the clamping end is behind the fender fold; and
   a guide integrally molded into the mud flap body to extend rearwardly from a general rear surface thereof, the guide disposed in sufficient proximity to at least one lateral edge of the sliding clamping member that rotation of the sliding clamping member with the attachment bolt as a unit is prevented;
   rotation of the attachment bolt causing the sliding clamping member to be drawn forwardly toward the rear side of the mud flap body and causing the clamping of the fender fold between the clamping end of the sliding clamping member and the edge of the mud flap body.

2. The mud flap of claim 1, wherein the sliding clamping member has a fulcrum end extending from the bolt hole in a different direction than the clamping end thereof, the fulcrum end of the sliding clamping member abutting the rear surface of the mud flap body when the clamping end is clamping the fender fold to said edge of the mud flap body.

3. The mud flap of claim 2, wherein the fulcrum end of the sliding clamping member is is positioned, relative to the bolt hole, about 180 degrees from the clamping end thereof.

4. The mud flap of claim 2, wherein the sliding clamping member is made of a substantially flat piece of metal, the fulcrum end of the sliding clamping member frontwardly offset from a general plane of the sliding clamping member.

5. The mud flap of claim 2, wherein the sliding clamping member is made of a substantially flat piece of metal, the fulcrum end of the sliding clamping member turned frontwardly from a general plane of the sliding clamping member to register with the rear face of the mud flap body.

6. The mud flap of claim 1, wherein the sliding clamping member is made of a substantially flat piece of metal, the clamping end of the sliding clamping member frontwardly offset from a general plane of the sliding clamping member.

7. The mud flap of claim 1, wherein the sliding clamping member is elongate and has generally parallel sides extending in an inboard direction from the clamping end.

8. The mud flap of claim 1, wherein said guide has a portion which is disposed upwardly and in an outboard direction from the attachment bolt when the sliding clamping member is in the engaged position, an edge of the sliding clamping member abutting said portion of the guide to prevent rotation of the sliding clamping member with the attachment bolt as said unit.

9. The mud flap of claim 1, wherein said guide has an upper wall section and an opposed, lower wall section parallel to the upper wall section, the upper and lower wall sections forming a channel sized to receive the sliding clamping member, the sliding clamping member sliding from the disengaged position to the engaged position in the channel.

10. The mud flap of claim 1, wherein the elongate slot is linear.

11. The mud flap of claim 1, wherein the mud flap has further attachment means comprising an attachment bolt and a mounting screw hole for alignment with a preexisting vehicle manufacturer-drilled hole in the fender fold.

12. The mud flap of claim 1, and further including a rigid stationary clamping member which laterally surrounds the elongate slot and extends in an outboard direction to a position opposite the clamping end of the sliding clamping member when the sliding clamping member is in the engaged position, the attachment bolt slidably extending through the stationary clamping member, such that the fender fold may be clamped between the sliding clamping member and the stationary clamping member when the sliding clamping member is drawn frontwardly from the engaged position on the attachment bolt.

13. The mud flap of claim 12, wherein the stationary clamping member is fabricated of steel.

14. The mud flap of claim 12, wherein the stationary member is insert-molded into the mud flap body.

15. The mud flap of claim 12, wherein the stationary member is disposed on a front surface of the mud flap body.

16. A mud flap for attachment to a fender fold of a vehicle wheel well, comprising:
   a mud flap body having a front face for facing a wheel of the vehicle and a rear face for mounting to the vehicle wheel well;
   a screw-threaded attachment bolt received into an elongate slot formed in the mud flap body from the front face to the rear face thereof;
   a sliding clamping member having a bolt hole which is threadably carried on the attachment bolt, the sliding clamping member disposed rearwardly from the rear face of the mud flap body, a clamping end of the sliding clamping member extending in an outboard direction from the bolt hole, an edge of the mud flap body placed forwardly of the fender fold, the sliding clamping member translatable, in combination with the attachment bolt, along the elongate slot from a disengaged position in which the clamping end is not behind the fender fold to the engaged position in which the clamping end is behind the fender fold;

a guide of the mud flap body extending rearwardly from a general rear surface thereof, the guide disposed in sufficient proximity to at least one lateral edge of the sliding clamping member that rotation of the sliding clamping member with the attachment bolt as a unit is prevented;

rotation of the attachment bolt causing the sliding clamping member to be drawn forwardly toward the rear side of the mud flap body and causing the clamping of the fender fold between the clamping end of the sliding clamping member and the edge of the mud flap body, no portion of the guide or the sliding clamping member being visible when the mud flap is installed on the fender fold.

17. The mud flap of claim 16, wherein the clamping member further has a fulcrum end opposite the clamping end and extending in an inboard direction from the bolt hole, the fulcrum end of the sliding clamping member abutting the rear surface of the mud flap body when the clamping member is clamping the fender fold to said edge of the mud flap body, no portion of the fulcrum end of the clamping member being visible when the mud flap is installed on the fender fold of the vehicle wheel well.

18. The mud flap of claim 17, wherein the fulcrum end of the sliding clamping member is positioned, relative to the bolt hole, about 180 degrees from the clamping end thereof.

19. The mud flap of claim 17, wherein the sliding clamping member is made of a substantially flat piece of metal, the fulcrum end of the sliding clamping member frontwardly offset from a general plane of the sliding clamping member.

20. The mud flap of claim 16, wherein the sliding clamping member is made of a substantially flat piece of metal, the clamping end of the sliding clamping member frontwardly offset from a general plane of the sliding clamping member.

21. The mud flap of claim 16, wherein the sliding clamping member is elongate and has generally parallel sides extending in an inboard direction from the clamping end.

22. The mud flap of claim 16, wherein said guide has a portion which is disposed upwardly and in an outboard direction from the attachment bolt when the sliding clamping member is in the engaged position, an edge of the sliding clamping member abutting said portion of the guide to prevent rotation of the sliding clamping member with the attachment bolt as said unit.

23. The mud flap of claim 16, wherein said guide has an upper wall section and an opposed, lower wall section parallel to the upper section, the upper and lower wall sections forming a channel sized to receive the sliding clamping member, the sliding clamping member sliding from the disengaged position to the engaged position in the channel.

24. The mud flap of claim 16, wherein the elongate slot is linear.

25. The mud flap of claim 16, wherein the mud flap has further attachment means comprising an attachment bolt and a mounting screw hole for alignment with a preexisting vehicle manufacturer-drilled hole in the fender fold.

26. The mud flap of claim 16, and further including a rigid stationary clamping member formed around the elongate slot and extends in an outboard direction to a position opposite the clamping end of the sliding clamping member when the sliding clamping member is in the engaged position, the attachment bolt slidably extending through the stationary clamping member, such that the fender fold may be clamped between the sliding clamping member and the stationary clamping member when the sliding clamping member is drawn frontwardly from the engaged position along the attachment bolt.

27. The mud flap of claim 26, wherein the stationary clamping member is fabricated of steel.

28. The mud flap of claim 26, wherein the stationary clamping member is insert-molded into the mud flap body.

29. The mud flap of claim 26, wherein the stationary clamping member is disposed on a front surface of the mud flap body.

30. A mud flap for attachment to a fender fold of a vehicle wheel well, comprising:

a mud flap body having a front face for facing a wheel of the vehicle and a rear face for mounting to the vehicle wheel well;

a screw-threaded attachment bolt received into an elongate slot formed in the mud flap body from the front face to the rear face thereof;

a sliding clamping member having a bolt hole which is threadably carried on the attachment bolt, the sliding clamping member disposed rearwardly from the rear face of the mud flap body, a clamping end of the sliding clamping member extending in an outboard direction from the bolt hole, an edge of the mud flap body placed forwardly of the fender fold, the sliding clamping member translatable, in combination with the attachment bolt, along the elongate slot from a disengaged position in which the clamping end is not behind the fender fold to an engaged position in which the clamping end is behind the fender fold;

a guide formed to extend rearwardly from the rear face of the mud flap body, a first portion of the guide preventing the rotation of the sliding clamping member as a unit with the attachment bolt, a second portion of the guide propping the clamping end of the sliding clamping member rearwardly from the rear face of the mud flap body while the sliding clamping member is in the disengaged position, so as to prevent the clamping of the fender fold by the clamping member, the guide not propping the clamping end of the sliding clamping member rearwardly from the mud flap body while the sliding clamping member is in the engaged position, thereby permitting the clamping of the fender fold between the clamping end of the sliding clamping member and the mud flap body.

31. The mud flap of claim 30, wherein the first portion of the clamping member guide includes a wall formed on the rear face of the mud flap body to extend rearwardly therefrom, the wall disposed in sufficient proximity to at least one lateral edge of the sliding clamping member that rotation of the sliding clamping member with the attachment bolt as said unit is prevented.

32. The mud flap of claim 30, wherein the second portion of the clamping member guide includes a wall formed on the rear face of the mud flap body to extend rearwardly therefrom, an outboard end portion of the wall having a height which is preselected to be greater than a thickness of the fender fold to which the mud flap is to be affixed and propping the clamping end of the sliding clamping member when the sliding clamping member is in the disengaged position.

33. The mud flap of claim 32, wherein the sliding clamping member has a general width, at least one cross tab formed near the clamping end of the sliding clamping member being wider than said general width so as to be propped by said outboard end portion of the wall when the sliding clamping member is in the disengaged position.

34. The mud flap of claim 33, wherein the at least one cross tab comprises two opposed cross tabs.

35. The mud flap of claim 30, wherein a fulcrum end of the sliding clamping member is turned forwardly to register with a general rear surface of the mud flap body when the sliding clamping member is in the engaged position.

36. The mud flap of claim 30, wherein the sliding clamping member has a fulcrum end displaced in an inboard direction from the bolt hole, the fulcrum end, while the sliding clamping member is in the disengaged position, resting on a shelf of the guide, the shelf having a surface that is rearwardly displaced from the rear surface of the mud flap body, a shelf end extending from the surface of the shelf to the rear surface of the mud flap body, the shelf end displaced in an inboard direction from the elongate slot by a distance which is less than the displacement of the fulcrum end from the bolt hole, such that when the sliding clamping member is translated in an outboard direction from the disengaged position to the engaged position, the fulcrum end of the sliding clamping member will clear the shelf and contact the rear surface of the mud flap body.

* * * * *